(12) United States Patent
Kühnel et al.

(10) Patent No.: US 8,162,604 B2
(45) Date of Patent: Apr. 24, 2012

(54) DIFFUSOR

(75) Inventors: Janpeter Kühnel, Bulach (CH);
Heinz-Jürgen Feld, Niederwil (CH);
Christine Lindblom, Nussbaumen (CH)

(73) Assignee: ABB Turbo Systems AG, Baden (CH)

( * ) Notice: Subject to any disclaimer, the term of this patent is extended or adjusted under 35 U.S.C. 154(b) by 1371 days.

(21) Appl. No.: 11/802,530

(22) Filed: May 23, 2007

(65) Prior Publication Data
US 2007/0274826 A1 Nov. 29, 2007

(30) Foreign Application Priority Data

May 26, 2006 (EP) .................................. 06405234

(51) Int. Cl.
*F04D 29/30* (2006.01)
(52) U.S. Cl. ................ 415/211.1; 415/211.2; 415/208.4
(58) Field of Classification Search ............... 415/208.4, 415/209.1, 211.2, 208.1, 211.1
See application file for complete search history.

(56) References Cited

U.S. PATENT DOCUMENTS

| | | | | |
|---|---|---|---|---|
| 4,354,802 A | * | 10/1982 | Nishida et al. | 415/207 |
| 4,877,370 A | * | 10/1989 | Nakagawa et al. | 415/148 |
| 5,178,516 A | * | 1/1993 | Nakagawa et al. | 415/208.3 |
| 5,316,441 A | * | 5/1994 | Osborne | 415/208.4 |
| 6,155,779 A | * | 12/2000 | Watanabe et al. | 415/150 |
| 7,101,151 B2 | * | 9/2006 | Loringer et al. | 415/211.2 |

FOREIGN PATENT DOCUMENTS

| | | |
|---|---|---|
| EP | 0 305 879 A2 | 3/1989 |
| WO | WO 2005/035993 A | 4/2005 |

OTHER PUBLICATIONS

European Search Report.

* cited by examiner

*Primary Examiner* — Edward Look
*Assistant Examiner* — Ryan Ellis
(74) *Attorney, Agent, or Firm* — Buchanan Ingersoll & Rooney PC

(57) ABSTRACT

The guide device for the diffusor at the compressor impeller outlet of a radial compressor has guide blades with stepped inlet edges. The step is implemented by setting back the hub-side inlet edge. This meridional stepping divides the guide blades into two component blades, of which the first component blade is made longer than the second component blade. The set-back of the inlet edge of the hub-side component blade and the associated superposition of the noise fields which are produced on the front and rear inlet edge of the diffusor leads to improvement of the acoustic properties of the compressor.

8 Claims, 4 Drawing Sheets

DIFFUSOR

RELATED APPLICATIONS

This application claims priority under 35 U.S.C. §119 to EP Application 06405234.3 filed in Europe on May 26, 2006, the entire contents of which are hereby incorporated by reference in their entireties.

TECHNICAL FIELD

The disclosure relates to the field of compressors of exhaust gas turbochargers for supercharged internal combustion engines. It relates to a guide device for the diffusor on the compressor impeller outlet of a radial compressor and a compressor with this guide device.

BACKGROUND INFORMATION

In modern exhaust gas turbochargers, to increase the intake pressure of internal combustion engines, single-stage radial compressors with bladed diffusors at the compressor impeller outlet are generally used. The diffusors have a guide device with guide blades with prismatic, generally aerodynamic profiles. The outflow of the compressor impeller is hallmarked essentially by a so-called jet wake flow in which radially low-momentum flow collects on the side of the inlet housing (shroud side), while on the hub side there is a healthy flow. Thus the radial velocity component of the flow drops over the height of the diffusor channel.

In the design of compressor stages a compromise must always be found between the aerodynamic performance, mechanical load and acoustic noise formation by a compressor. Compressor stages with high specific absorption capacity have long moving blades with natural vibration forms which occur at relatively low frequencies and which are very easily excited and caused to oscillate. The main source of these excitations is a nonuniform pressure potential field which is produced by the guide blades of the guide device of the diffusor. According to experience, the compressor stages with high specific absorption capacities also produce high noise levels at the compressor outlet which are caused essentially by the impact of the flow fluctuations over time on the guide blades of the guide device of the diffusor.

One focus of continuing research for improving the stage consists in designing radial compressors such that the pump limit is shifted to flow rates as small as possible without in doing so having to tolerate adverse effects on efficiency. If the characteristic diagrams are narrow, numerous specifications with different blade heights and/or diffusors for matching to the varied application must be observed; this leads to high storage costs.

To reduce blade vibrations the moving blades of the compressor impeller can be thickened or the distance of the guide device of the diffusor to the compressor impeller outlet can be increased to reduce excitation. The increase of the distance of the guide device of the diffusor leads at the same time to a noise reduction. But both measures lead to a reduction in efficiency, for which reason the desired thermodynamic performance would be missed.

In order to correspond to the described flow lamination, guide blades tilted meridionally can be used in the guide device of the diffusors. This results in that faulty incident flow on the guide blade incidence edges is minimized and thus better efficiency is achieved. In addition, the meridionally tilted guide blades cause a reduction of the vibration excitation of the guide blades and reduced exit noise generation by the blade wheel/guide wheel interaction. When using meridionally tilted guide blades in the guide device of the diffusors at high absorption capacities strict acoustic requirements cannot be met under certain circumstances. Production of diffusors with meridionally tilted guide blades is moreover much more complex than that of prismatic blades. Instead of being able to cut a blade in one cutting process, the profile must be shaved over the height in several steps.

U.S. Pat. No. 5,178,516 discloses a guide device on the compressor impeller outlet of radial compressors in which to improve flow properties the inlet edges of the guide blades on the inlet side are nearer the compressor impeller outlet than on the hub side. With the inlet-side lengthening of the guide blades, the result should be that no recirculation flows occur locally directly radially outside the compressor impeller outlet. Here it is explicitly stipulated that the maximum distance of the blade inlet edge on the entry side should be less than 10 out of one hundred of the outside radius of the compressor moving blades. The set-back inlet edge on the hub side is accordingly spaced more than 10 out of one hundred of the outside radius of the compressor moving blades away from the compressor impeller outlet. The height of the lengthened blade tip is stipulated at 10 to 60 out of one hundred of the height of the diffusor channel.

U.S. Pat. No. 5,529,457 discloses from a similar arrangement that for simpler production different inlet edges of the guide blades can be implemented by one stage.

With the lengthening of the guide blade tips which was proposed in these two documents the attempt is made to enlarge the operating region of the compressor. Noise abatement measures play no part in the details. Due to the reduction of the distance of the inlet edges of the guide blades from the compressor impeller outlet, with the suggested stepping of the inlet edge of the guide blades the noise at the compressor outlet and excitation of blade vibrations however should rather increase.

SUMMARY

Noise abatement measures are disclosed for a compressor with high absorption capacity. For example, a guide device is disclosed for the diffusor at the compressor impeller outlet of a radial compressor, in which the guide blades have meridionally stepped inlet edges, the step being implemented by setting back the hub-side inlet edge. This meridional stepping divides the guide blades into two component blades, of which the first component blade is made longer than the second component blade.

The set-back of the inlet edge of the hub-side component blade and the associated superposition of the noise fields which are produced on the front and rear inlet edges of the guide blades of the diffusor leads to additional improvement of the already favorable acoustic properties of the diffusors with meridionally tilted guide blades.

With the stepped diffusor a greater useful characteristic diagram width at the same efficiency and lower exit noise can be achieved than for a meridionally tilted diffusor.

The thermodynamic performance is likewise improved by a diffusor with meridionally stepped guide blades. While the radially low-momentum flow on the inlet side is guided by the long part of the profile such that the flow assumes the desired direction, on the lift side for a healthy flow (high in radial pulses) a very short diffusor with a large, extremely narrow cross section is used. It is known of diffusors with short guide blades without a meridional tilt or step that they improve the stability of the compressor stage and achieve good efficiencies since the flow-wetted area is small and thus friction losses are low. The improved stability of the flow leads to wider characteristic diagrams. Thus, with one specification a greater bandwidth of engine operating lines which differ in absorption behavior can be accommodated. In this way the number of required specifications is minimized and thus the storage costs can be reduced.

Moreover, compared to the meridionally tilted guide blades, for the guide blades made stepped with component blades of varied length there are advantages in production. In this case advantageously first of all the guide blade profile is produced as a prismatic profile and then a smaller, likewise prismatic profile is reworked out of the hub-side part at a constant height. This reduces the production cost compared to a meridionally tilted diffusor.

BRIEF DESCRIPTION OF DRAWINGS

Various exemplary embodiments of the guide device are described below using the drawings.

DETAILED DESCRIPTION

Figure 1:
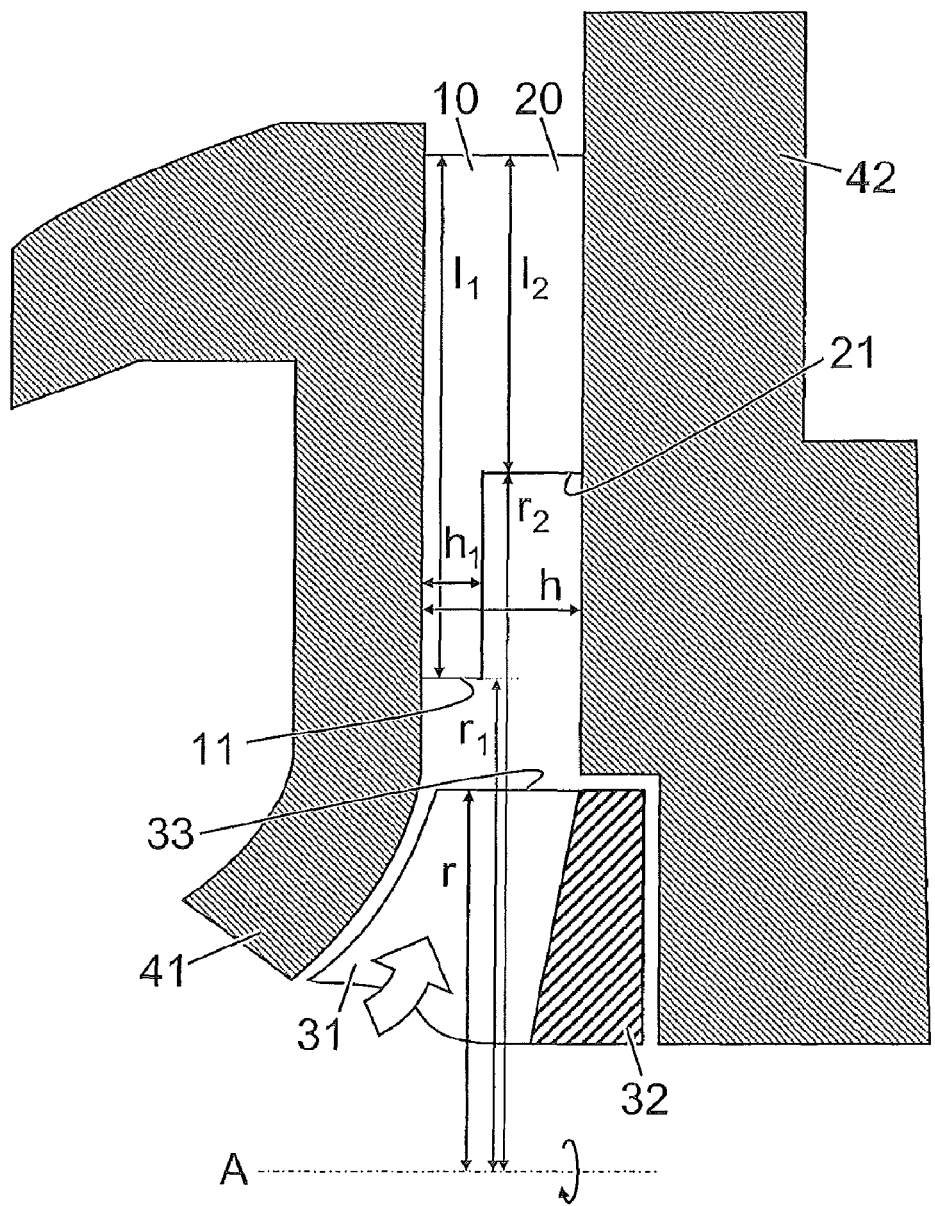
FIG. 1 shows a section through an exemplary diffusor at the outlet of the blade wheel of a radial compressor with a first exemplary embodiment of the guide device having shortened component guide blades.

In a compressor housing which is shown only partially in FIG. 1, a compressor impeller is arranged to be able to turn around an axis A. The compressor housing is schematically comprised of an inlet side housing part 41 and a hub-side housing part 42. The compressor impeller sits on a shaft which for an exhaust gas turbocharger is driven by a turbine which is not shown. The compressor impeller surrounds the hub 32 and, located on the hub, a host of guide blades 31. They extend from the incident flow-side end of the compressor impeller as far as the outflow-side end on the radial outside edge of the compressor impeller. The flow direction is indicated with a thick arrow.

In the flow direction farther downstream of the outflow-side end of the compressor impeller, there is a diffusor. The diffusor is comprised of the diffusor walls and a guide device with several guide blades located distributed along the periphery. The diffusor walls border the flow channel downstream of the compressor impeller.

The guide blades of the exemplary guide device are comprised of several component blades. In the first exemplary embodiment there are two component blades 10 and 20. The first component blade 10 adjoins the inlet-side housing wall and extends into the interior of the diffusor channel. The inlet edge 11 of the first component blade lies on a radius $r_1$ which advantageously measures roughly 110 to 125 out of one hundred of the outer radius r of the outflow edges 33 of the guide blades 31 of the compressor impeller. An overly small distance can lead to vibration problems, while an overly large distance adversely affects the efficiency.

Figure 3:
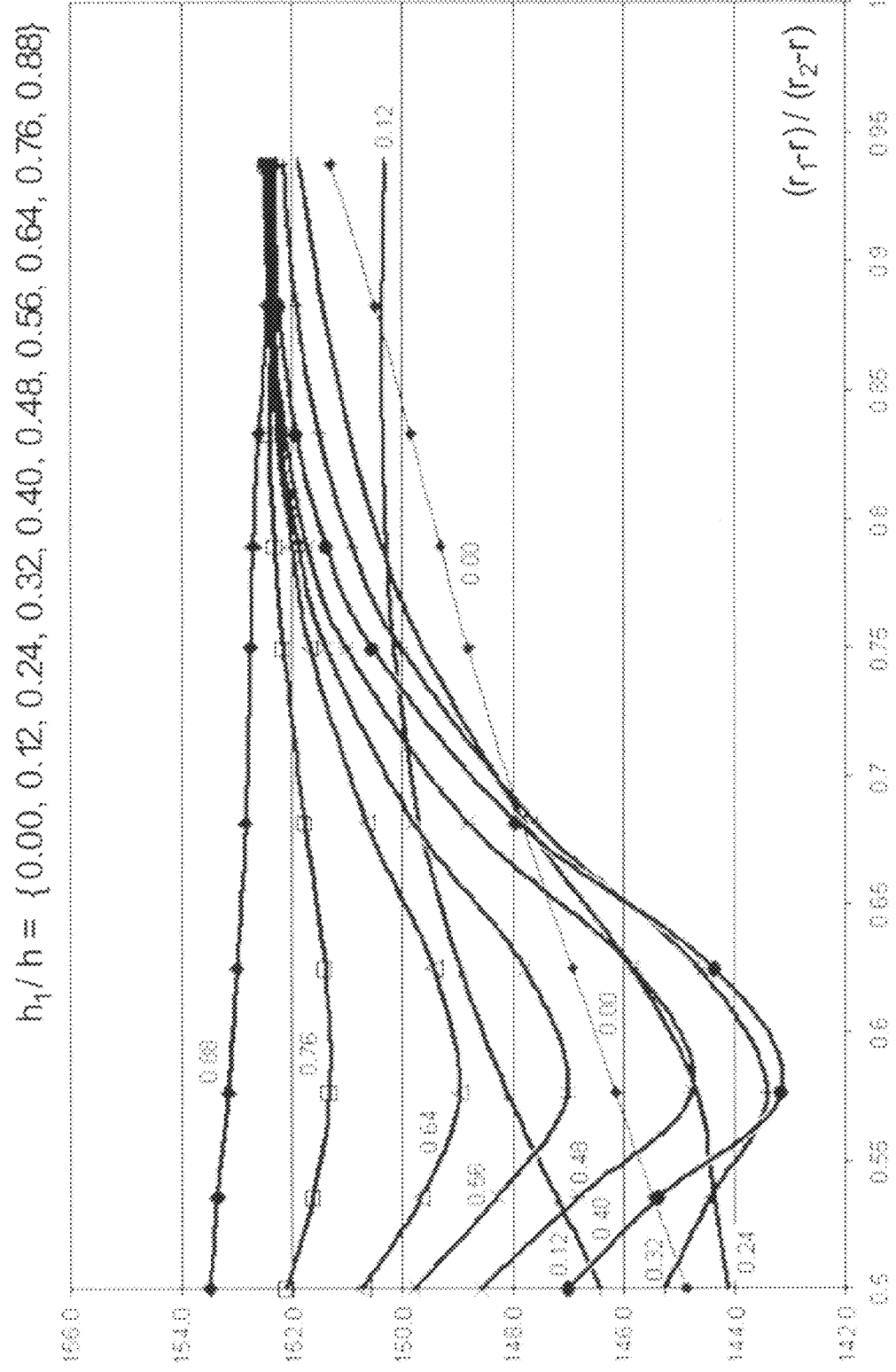
FIG. 3 shows a curve diagram with noise development as a function of the ratio between the distances of the inlet edges of the component guide blades on the outlet edge of the moving blades of the compressor impeller for different heights of the component guide blades.

The inlet edge 21 of the second component blade is set back meridionally relative to the inlet edge of the first component blade. Considerations leading to the disclosure and noise computations based thereon have shown that the blade profile length $l_2$ of the second component blade 20 with respect to the blade profile length $l_1$ of the first component blade 10, or the ratio of the distances of the inlet edges of the component blades from the outside radius of the outflow edges of the moving blades $(r_2-r)/(r_1-r)$ can be optimized depending on the ratio of heights of the component blades. The diagram in FIG. 3 shows the noise behavior for a different configuration of the stepped guide blades. Each curve shows the noise behavior for the indicated ratio of the height of the first component blade to the total of the heights of all component blades $h_1/h$ as a function of the ratio of the distances of the inlet edges of the component blades on the outside radius of the outflow edges of the moving blades $(r_1-r)/(r_2-r)$.

Computations have shown that the noise can be reduced for a height of the first component blade $h_1$ of roughly 30 to 70 out of one hundred of the sum of the heights of all component blades h in the region of the distance of the inlet edge of the first component blades from the outside radius of the outflow edges of the moving blades $(r_1-r)$ of roughly 50 to 85 out of one hundred of the distance of the inlet edge of the second component blades from the outside radius of the outflow edges of the guide blades $(r_2-r)$.

The computed absolute minimum of noise development is at the height of the first component blade $h_1$ of roughly 38 to 42 (the value used for the computation was 40) out of one hundred of the sum of the heights of all component blades h in the region of the distance of the inlet edge of the first component blades from the outside radius of the outflow edges of the moving blades $(r_1-r)$ of roughly 55 to 60 out of one hundred of the distance of the inlet edge of the second component blades from the outside radius of the outflow edges of the guide blades $(r_2-r)$. It must be watched that when the compressor geometries change, for example for a different number of blades or different specific absorption capacity, these values should experience certain deviations. The optimum region should thus lie around the aforementioned values depending on the exact geometry of the compressor.

The computed values were experimentally confirmed.

Figure 4:
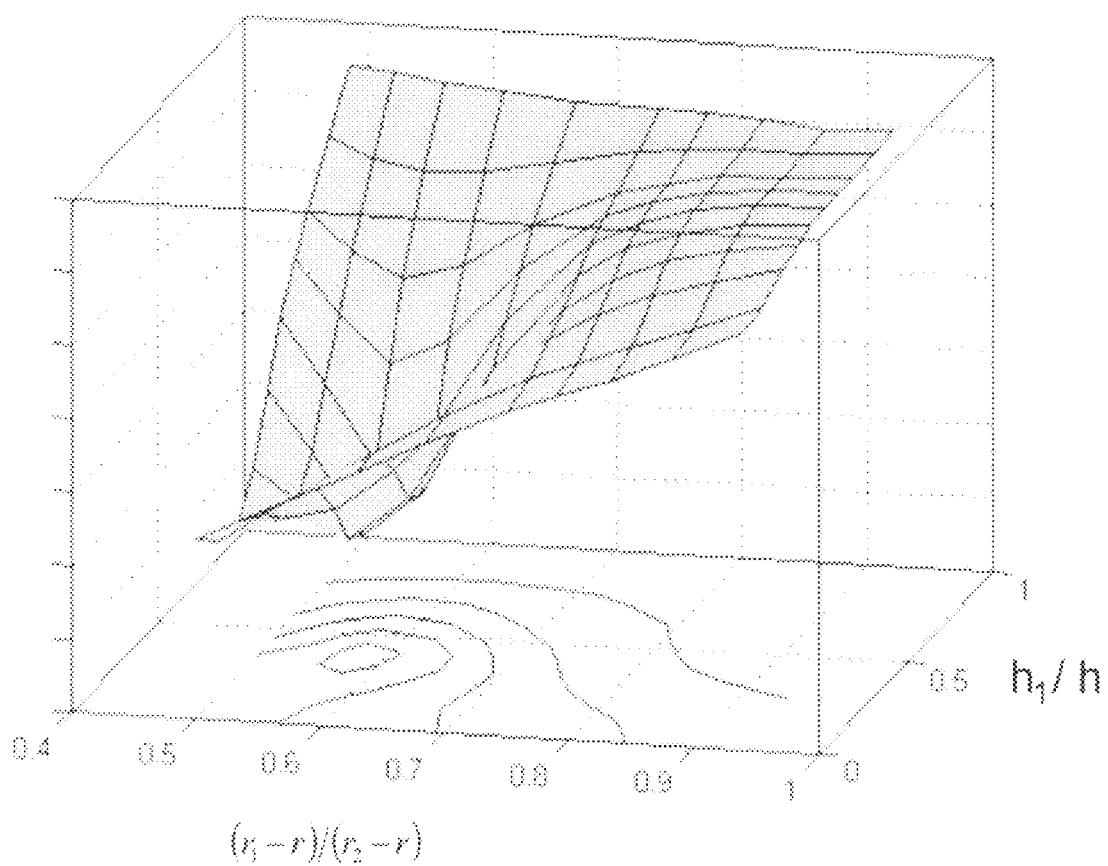
FIG. 4 shows a three-dimensional representation of the different curve behaviors of the diagram as shown in FIG. 3.

The curve family of the diagram from FIG. 3 is shown again in FIG. 4 three-dimensionally. Curves with constant noise values can be projected onto the bottom area. Here it is shown again that the optimum is in the above described region.

Figure 2:
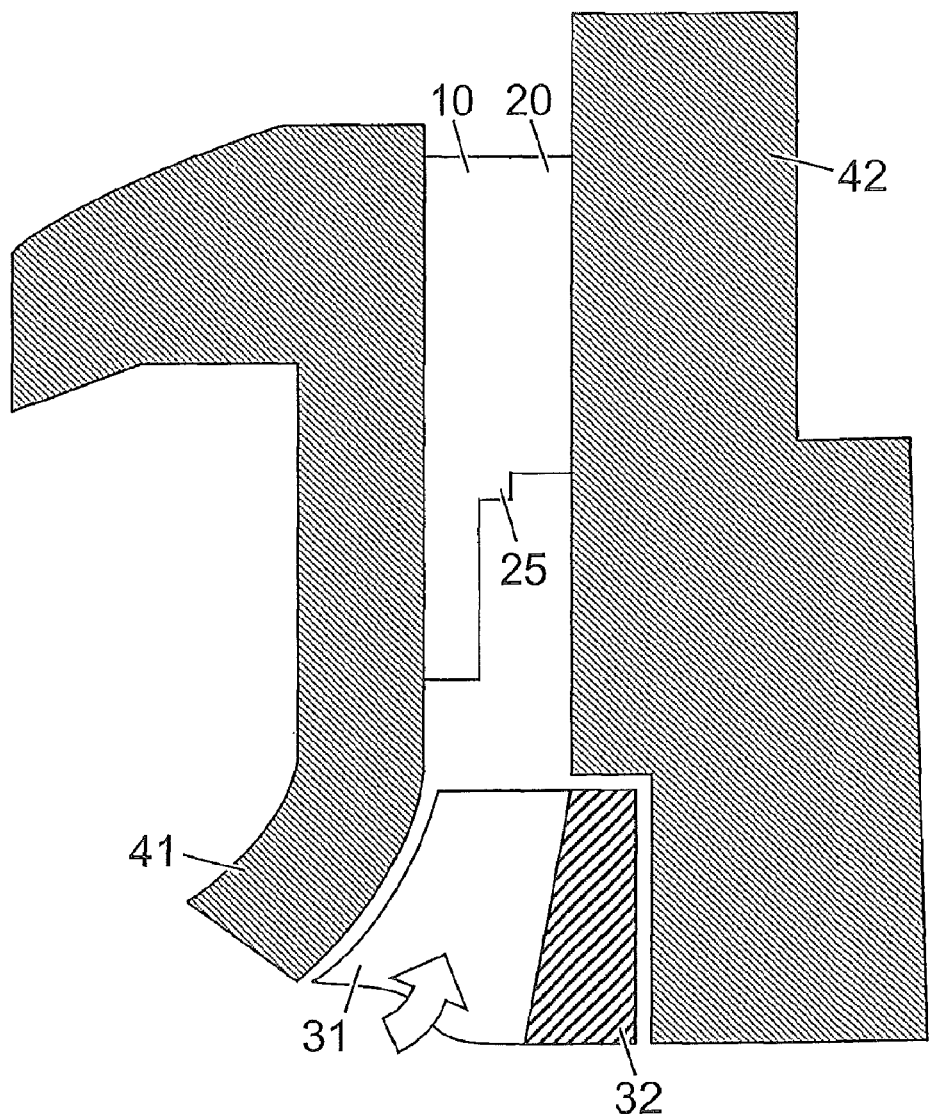
FIG. 2 shows a section through a diffusor at the outlet of a radial compressor with a second exemplary embodiment of the guide device.

FIG. 2 shows a second exemplary embodiment of the guide device. Between the first component blade 10 and the shortened second component blade 20 there is a third component blade 25. This third component blade has a blade profile length which is between the blade profile lengths of the first and second component blades. Other stages can be implemented by other component blades. The guide blades acquire finer meridional stepping by additional component blades, with which the guide device can be altogether better matched to the flow structure along the height of the diffusor channel.

The first and second component blades and possible other component blades have a common exit edge in one exemplary embodiment. It runs transversely over the entire height of the diffusor channel.

The moving blades of the guide device have aerodynamic, straight or curved blade profiles.

In one exemplary embodiment, the blade profiles of the shorter component blade at the time run entirely around the periphery within the blade profile of the next larger component blade.

In another exemplary embodiment, the blade profile of one shorter component blade at the time corresponds to the blade profile of one longer component blade at the time scaled with a reduction factor less than 1.

In the production of the divided guide blades, in a first working step the guide blade is produced with the height of the diffusor channel. This guide blade already has the blade profile of the first component blade on the inlet side. Then the shorter component blades are cut out of the blade profile of the original guide blade. In repeating passes thus several component blades can be produced, one shorter one out of the guide profile of the next larger. In this connection production is facilitated by the blade inlet edges being made stepped.

The inlet edges of the two component blades of the guide device, which edges are arranged stepped meridionally, lead to weakening of the pressure pulsation which is produced by the flow at the outlet of the compressor impeller. This weakening of the pressure pulsation in turn has a beneficial effect on the excitation of the vibration of the moving blades of the compressor impeller; this has a positive effect especially when the moving blade thickness is reduced since in this way loading of the guide blades can be clearly reduced. On the other hand, this weakening of the pressure pulsation and the associated, less strong excitation allow a higher volumetric flow with the dimensions of the compressor and diffusor remaining the same. The higher volumetric flow due to the meridionally stepped inlet edges of the guide blades of the diffusor does not lead to an unallowable increase in the excitation of the moving blades of the compressor impeller.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

REFERENCE NUMBER LIST 10 first component blade (inlet side)
11 inlet edge of the first component blade
20 second component blade (hub side)
21 inlet edge of the second component blade
25 third component blade
31 moving blades of the compressor impeller
32 hub of compressor impeller
33 outflow edge of the moving blades of the compressor impeller
41 inlet-side housing
42 hub-side housing
$l_1$ blade profile length of the first component blade
$l_2$ blade profile length of the second component blade
$h_1$ blade height of the first component blade
h total height of the first and second component blades
r outside radius of the compressor impeller on the outflow edge of the moving blades
$r_1$ inside radius of the inlet edge of the first component blade
$r_2$ inside radius of the inlet edge of the second component blade

What is claimed is:

1. A guide device for a diffusor on a compressor impeller outlet of a radial compressor, comprising:
    an inlet-side housing part;
    a hub-side housing part;
    a plurality of guide blades, the guide blades being located between the inlet-side housing part and the hub-side housing part, each guide blade being divided into a first, inlet-side component blade and at least one other, second, hub-side component blade, and a blade profile length of the first component blade being larger than a blade profile length of the second component blade, and
    wherein between the first component blade and the second component blade there is at least one third component blade, the third component blade extending over a length which is between the blade profile length of the first component blade and the blade profile length of the second component blade.

2. Guide device as claimed in claim 1, wherein the first component blade on a blade inlet edge has an inside diameter which is 110 to 125 percent of an outer diameter of a compressor impeller radius.

3. Guide device for the diffusor of a radial compressor as claimed in claim 1, wherein outflow edges of the component blades jointly form a continuous outflow edge of the guide blades.

4. Guide device for the diffusor of a radial compressor as claimed in claim 1, wherein a blade profile of one second component blade corresponds to a blade profile of one first component blade scaled with a reduction factor.

5. Guide device for the diffusor of a radial compressor as claimed in claim 1, wherein outflow edges of the component blades jointly form a continuous outflow edge of the guide blades.

6. Guide device for the diffusor of a radial compressor as claimed in claim 1, wherein a blade profile of the second component blade lies completely within a blade profile of the first component blade.

7. Guide device for the diffusor of a radial compressor as claimed in claim 1, wherein a blade profile of one second component blade corresponds to a blade profile of one first component blade scaled with a reduction factor.

8. An exhaust gas turbocharger, comprising:
    a guide device for a diffusor on a compressor impeller outlet of a radial compressor, including:
    an inlet-side housing part;
    a hub-side housing part;
    a plurality of guide blades, the guide blades being located between the inlet-side housing part and the hub-side housing part, each guide blade being divided into a first, inlet-side component blade and at least one other, second, hub-side component blade, and a blade profile length of the first component blade being larger than a blade profile length of the second component blade, and
    wherein between the first component blade and the second component blade there is at least one third component blade, the third component blade extending over a length which is between the blade profile length of the first component blade and the blade profile length of the second component blade.

* * * * *